June 1, 1954 M. P. MATTHEW 2,679,916
SHIFT CLUTCH
Filed Sept. 1, 1950 4 Sheets-Sheet 1
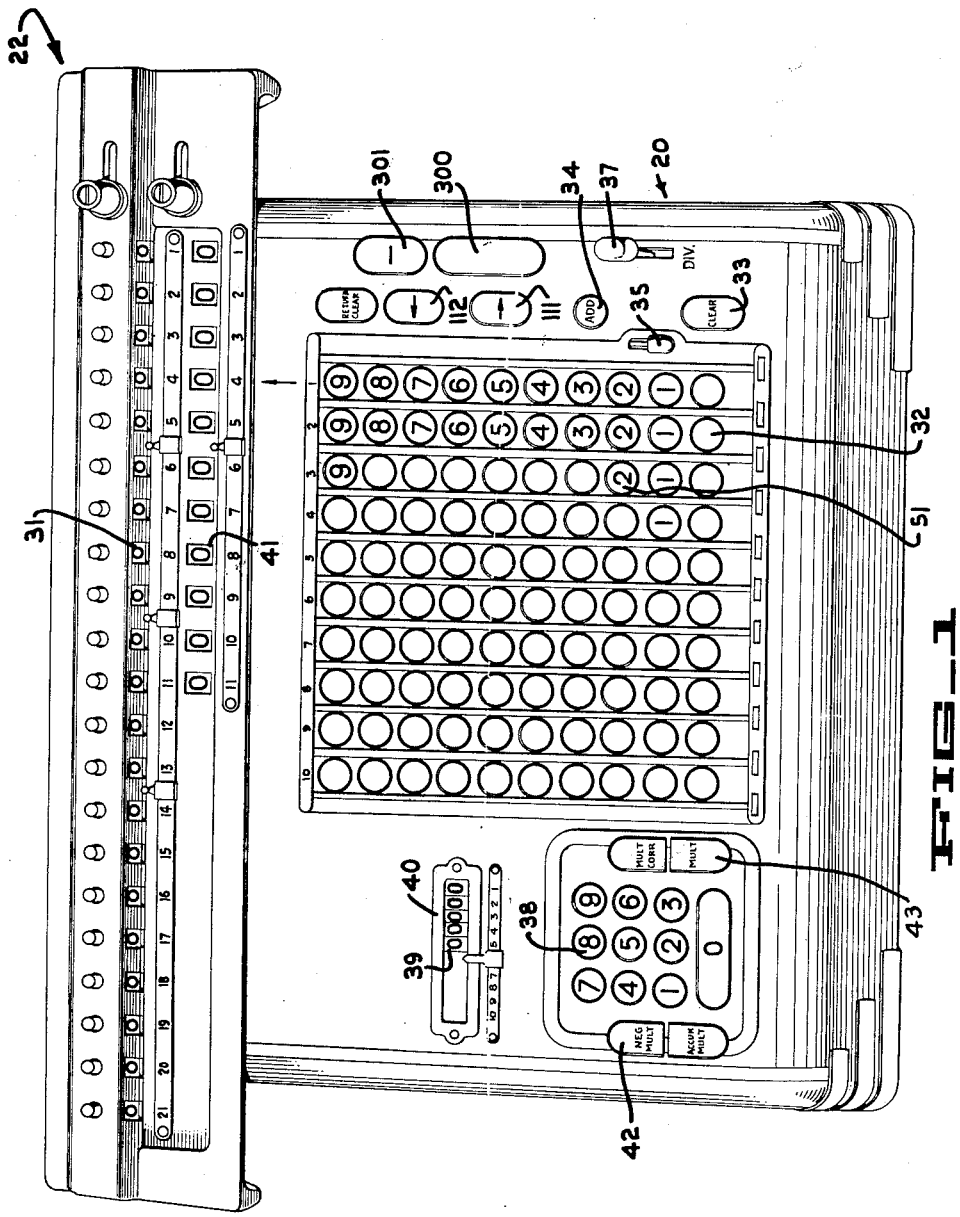
INVENTOR.
MORTON P. MATTHEW
BY

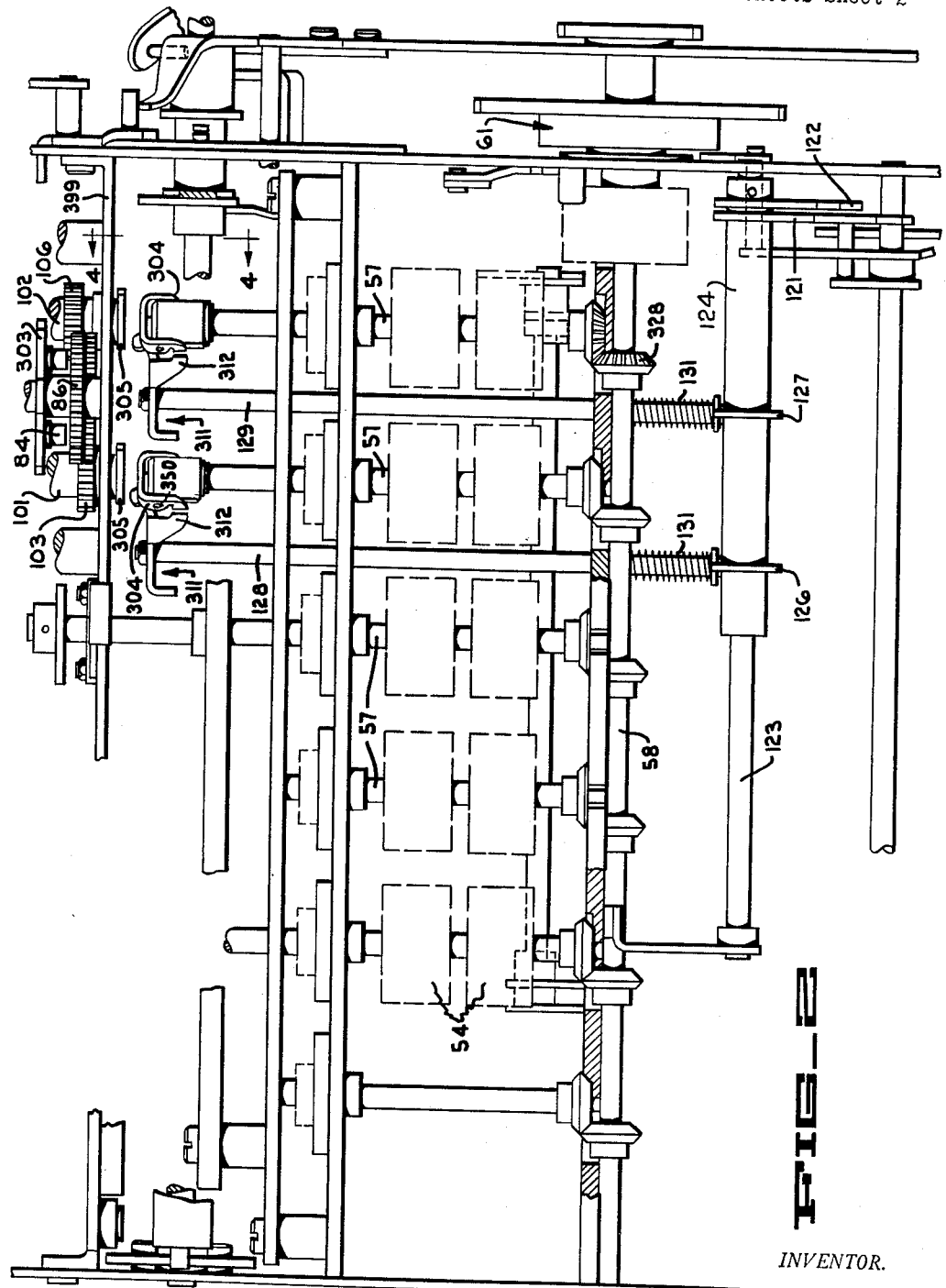

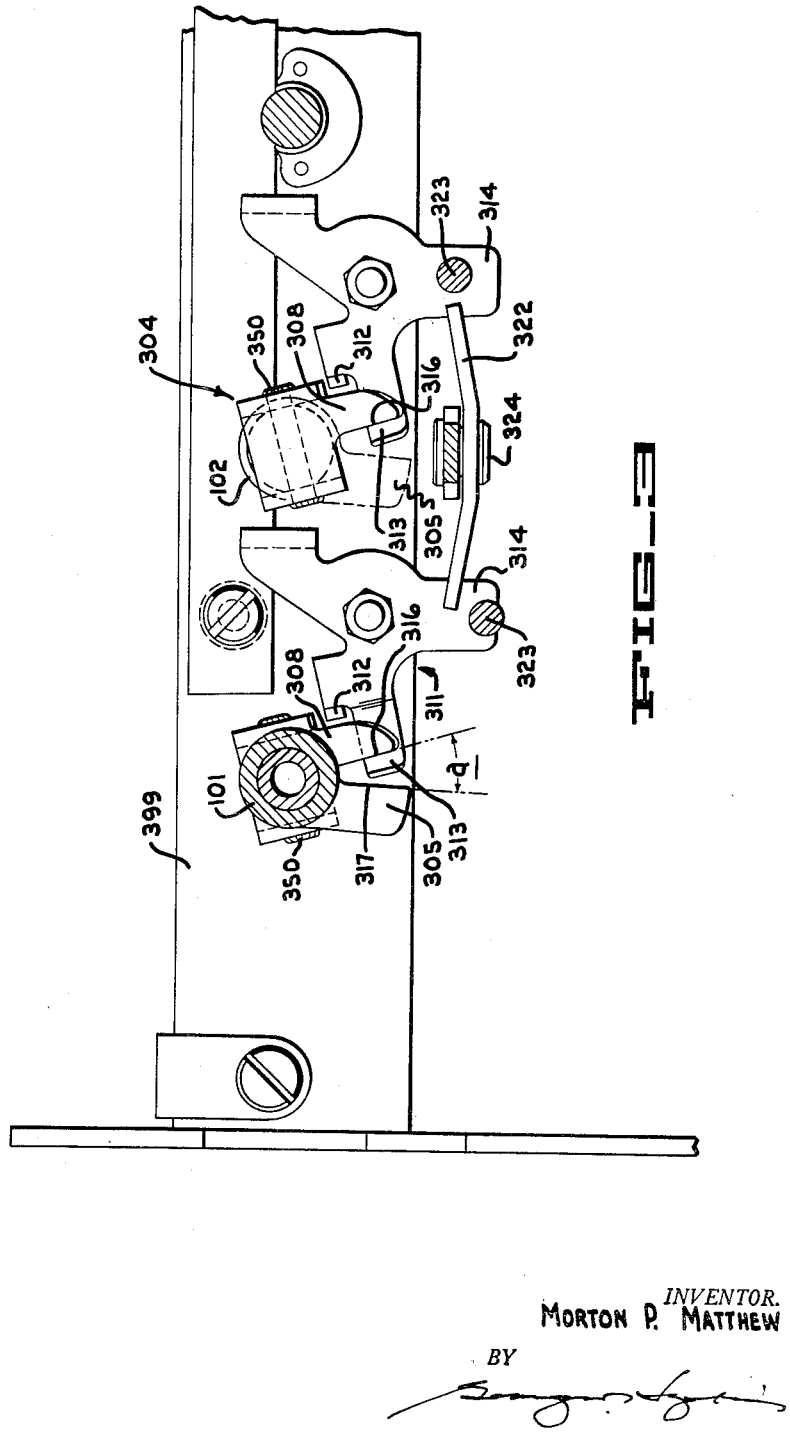

June 1, 1954 M. P. MATTHEW 2,679,916
SHIFT CLUTCH
Filed Sept. 1, 1950 4 Sheets-Sheet 4
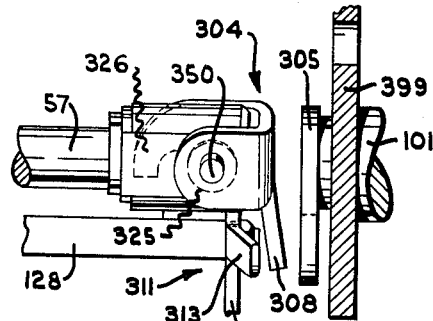
FIG_4
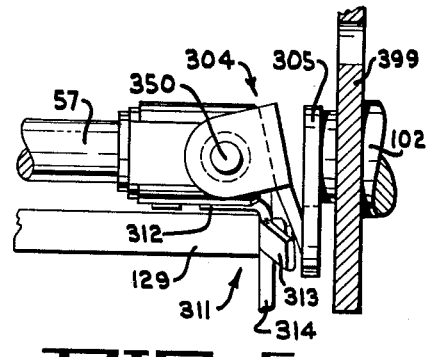
FIG_5
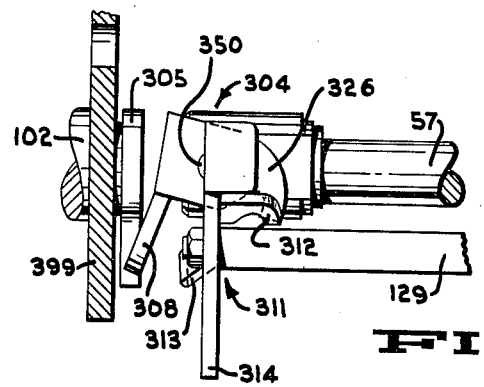
FIG_6
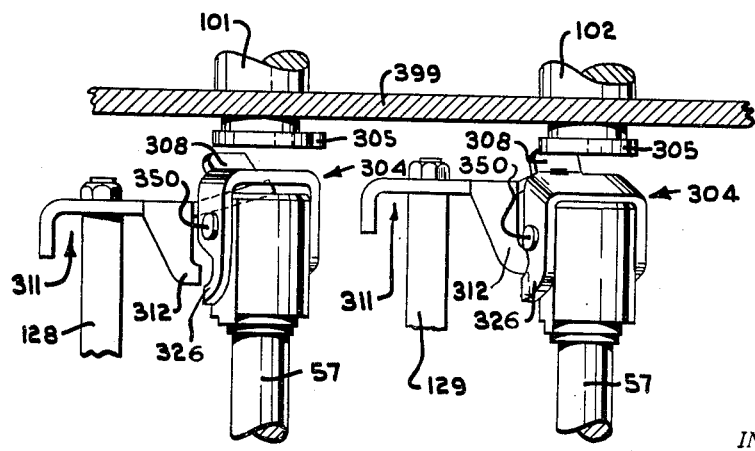
FIG_7
INVENTOR.
MORTON P. MATTHEW
BY a# UNITED STATES PATENT OFFICE 2,679,916

SHIFT CLUTCH

Morton P. Matthew, Berkeley, Calif., assignor to Friden Calculating Machine Co., Inc., a corporation of California Application September 1, 1950, Serial No. 182,632

4 Claims. (Cl. 192—22)

This invention relates to clutch mechanisms particularly adapted for use with business machines such as automatic calculators having a carriage which is laterally shiftable in either direction, and relates more particularly to an improved clutch arrangement therefor which is smooth in operation and also permits wide flexibility and latitude in the operation of the associated clutch control mechanism.

In the construction and operation of calculating machines and other types of automatic machines having a carriage which must be laterally shifted selectively in either direction at rapid rates of speed, it has been a practice heretofore to drive the associated reversible carriage drive assembly by means of one or more shift clutches of the dog type or other known design, the operation of which is often irregular and frequently imposes critical timing and other functional limitations on the shift clutch control mechanism and the related automatic and semiautomatic controls of the machine.

It is an important object of the present invention, therefore, to provide an improved shift clutch mechanism for smoothly shifting the carriage of an automatic business machine selectively in either direction while preserving a high degree of flexibility and latitude in the operation of the associated clutch control mechanism.

It is also an object of the invention to provide an improved mechanism for operating the carriage shift mechanism of an automatic business machine in such a manner as to facilitate high flexibility and wide latitude in the operation of the associated shift control mechanism.

It is another object of the invention to produce a carriage shift clutch for an automatic business machine which not only provides flexibility and wide latitude in the operation of the associated shift control mechanism, but also minimizes wear on the clutch engaging surfaces and other clutch components.

It is another object of the invention to produce an improved shift clutch for the shiftable carriage of a business machine, or the like, which clutch may be smoothly and easily engaged and disengaged by power obtained from the main drive shaft, in response to the position of a previously adjusted and conditioned control member, without subjecting the associated clutch control mechanism to loads tending to prevent functional control of the clutch by relatively light key touch action.

It is a further object of the invention to provide an improved shift clutch for controlling the shifting of a business machine carriage laterally in a predetermined direction, which clutch may be smoothly and easily engaged or disengaged substantially under no load conditions during a predetermined control phase of the shift-operating cycle.

It is still another object of the invention to provide an improved shift clutch for the shiftable carriage of an automatic calculating machine, which clutch is adapted to be smoothly engaged or disengaged during a relatively short predetermined clutch control phase which precedes the relatively long operating phase of the machine cycle, with the result that the associated clutch control mechanism may be readily conditioned for either clutching or declutching engagement without critical timing and with relatively wide latitude.

It is also an object of the invention to produce an improved carriage shift clutch for an automatic calculating machine, which when previously engaged can be effectively conditioned at any time substantially up to the end of any desired shift cycle for positive disengagement at the beginning of the following machine cycle, but without causing an extra ordinal movement of the shiftable carriage beyond its selected ordinal position.

Further objects are to provide a construction of maximum simplicity, economy, and ease of assembly and disassembly, also such further objects, advantages, and capabilities as will fully appear and as are inherently possessed by the device and the invention described herein.

The invention further resides in the combination, construction, and arrangement of parts illustrated in the accompanying drawings, and while there is shown therein a preferred embodiment thereof, it is to be understood that the same is illustrative of the invention, and that the invention is capable of modification and change and comprehends other details of construction without departing from the spirit thereof or the scope of the appended claims.

Referring to the drawings:

Fig. 1 is a plan view of a standard Friden calculating machine showing the keyboard and control panel arrangement thereof.

Fig. 2 is a cross sectional plan view of the machine of Fig. 1 with certain parts removed to more clearly show the construction and arrangement of the carriage shift control mechanism.

Fig. 3 is an enlarged rear view of the shift clutch mechanism and the shift interlock device associated therewith.

Fig. 4 is a side elevational view showing the shift clutch mechanism in its normally disengaged position, the view being taken along the lines 4—4 in Fig. 2 and looking in the direction of the arrows.

Fig. 5 is similar to Fig. 4, but shows the shift controller moved rearwardly so as to position the clutch driver in its clutch-engaging position.

Fig. 6 is similar to Fig. 5, the elevational view being taken from the opposite side of the shift clutch mechanism.

Fig. 7 is a plan view of the mechanism of Fig. 3, with the interlock device removed to more clearly show details of the shift clutch and the associated shift control mechanism.

General arrangement

The calculating machine selected for illustration in conjunction with the instant invention is of the general type shown and described in Patent No. 2,229,889, issued to Carl M. F. Friden on January 28, 1941, as modified by Friden Patent No. 2,315,780, dated April 6, 1943. Although a machine of this type utilizes a pair of unidirectional and cyclically driven clutches and a single reversible drive gear assembly to shift the carriage selectively in either direction by engaging one shift clutch while disengaging the other, it will be readily apparent to those skilled in the art that a single clutch mechanism of the type described herein may be used with other known types of reversing mechanisms having a pair of oppositely rotated output shafts which are adapted to accomplish the desired result of ordinally shifting the carriage selectively in either direction. It will become evident from a study of the present disclosure, therefore, that the invention is not limited to use with inventions of the type disclosed in Patents No. 2,229,889 and No. 2,315,780, supra, but may also be applied to other types of computing and business machines with equally desirable results.

The general arrangement and operation of such a standard Friden calculating machine is well known, and includes a main body portion 20 (Fig. 1) in which the actuating, selecting, and control mechanisms are mounted, and a shiftable register carriage 22 mounted for endwise shifting movement transversely of the body portion, which carriage 22 carries numeral wheels 31 and 41 of the accumulator and revolutions counter, respectively. The carriage 22 may be shifted in either direction by power derived from the electric driving motor of the machine by suitable control means, such as manipulating the carriage shift keys 111 and 112.

Amounts to be entered into the accumulator wheels 31 may be set up on the amount keys 51, after which the amount may be entered positively or negatively into the accumulator wheels 31 by manipulation of the plus key 300 or the minus key 301 (Fig. 1). In case an erroneous setting is made on the amount keys 51, the incorrectly depressed key in any one of the individual key banks may be released by depression of the ordinal clear key 32 relating to that particular bank. If it is desired to simultaneously release all of the depressed keys on the keyboard, this may be accomplished by depression of the keyboard clear key 33 (Fig. 1). Since it is ordinarily desirable in adding and subtracting operations to cause all depressed amount keys to be released at the end of each machine cycle, an "add" key 34 is provided which may be depressed and latched down in order to cause the automatic release of all amount keys at the conclusion of each machine cycle. A keyboard lock lever 35 is also provided for locking all of the amount keys 51 in either their normal or depressed positions so as to preserve the value set therein for succeeding calculations to be performed on the machine.

Dividing operations are performed on this machine by entering the dividend on the accumulator wheels 31, setting the divisor into the amount keys 51, and then pulling forward and releasing the division lever 37. This will cause an automatic division operation to take place in which the divisor is repeatedly subtracted from the dividend until an overdraft occurs in the accumulator wheels 31, after which the divisor is added back into the accumulator so as to eliminate the overdraft and the carriage shifted one order to the left. The divisor is again repeatedly subtracted from the dividend in this order until an overdraft occurs, whereupon the divisor is added back into the accumulator wheels, the carriage shifted, and so on, from order to order until the quotient containing the desired number of decimal places is obtained in the revolutions counter wheels 41. For a complete disclosure of the automatic division mechanism, see Patent No. 2,327,981, issued August 31, 1943, to Carl M. F. Friden.

To the left of the amount keyboard is provided a group of ten multiplier keys 38 (Fig. 1) by means of which the multiplier of any desired value may be set into the machine. As each such key 38 is depressed, a number corresponding to the value of the key depressed is indicated on the multiplier indicator dials 39 which are visible through a window 40 (Fig. 1) provided in the casing of the machine. After a desired multiplier value has been set into the machine by means of the keys 38 and a multiplicand has been set up on the amount keyboard, an automatic multiplication operation may be initiated by depressing one of the multiplier control keys 43, 42. The key 43 will cause an automatic multiplication operation to take place in which the multiplicand will be successively multiplied by each digit of the multiplier. However, prior to the initiation of the multiplication operation, the carriage will be automatically shifted to its extreme lefthand position after which the multiplication of the multiplicand by each digit of the multiplier will take place, the carriage 22 being shifted one space to the right after each multiplication of the multiplicand by a multiplier digit. This operation will continue automatically until the multiplicand has been successively multiplied by each digit of the multiplier, after which the product will appear in the accumulator wheels 31 and the multiplier will now be indicated on the revolutions counter wheels 41. When the multiplication key 42 is depressed, a similar type of operation will take place except that now the product will be registered negatively in the accumulator wheels 31 instead of positively as was the case when the multiplication operation was initiated by the key 43. Reference may be had to Patent No. 2,371,752, issued to Carl M. F. Friden on March 20, 1945, and Patent No. 2,399,917, issued to Carl M. F. Friden and Anthony B. Machado on May 7, 1946, for a complete disclosure of the automatic multiplication mechanism of the machine.

Carriage shifting mechanism

Means are provided for shifting the carriage in either direction from one ordinal position to another by power-driven means controlled by manually operable keys. For this purpose carriage 22 is provided with a longitudinally disposed and ordinarily slotted shift rack, not shown, which is adapted to form a rack and pinion engagement with the coacting pins 84 on a pin wheel shift drive disk 303 adapted to be driven by the shift drive gear 86 (Fig. 2). In order to rotate the carriage shift disk 303 in either direction by selectively operable drive connections from the actuating means of the machine, the lowest order actuating shafts 57 (Fig. 2) are extended rearwardly and have respective clutch driving pawls 304 thereon, which pawls are pivotally connected by the pins 350 to the ends of the adjacent shafts 57 in such a manner as to form a readily controllable clutching and declutching engagement with the associated clutch following or driven arms 305 on the respective gear sleeves 101, 102, as will be hereinafter more fully described. Gear sleeve 101, which is suitably journalled in the rear bearing plate 399 of the machine, is provided with a gear 103 which is operable to drive the gear 86 in one direction, whereas the gear 106 on gear sleeve 102, also journalled in plate 399, acts through a suitable reverse gear in the associated reversible carriage drive mechanism so as to drive gear 86 in the opposite direction, as is fully shown and described in Friden Patent No. 2,315,780, supra. Thus, rotation of the gear sleeves 101 and 102 in a clockwise direction causes shifting of the carriage 22 to the left and to the right, respectively, as viewed from the rear of the calculating machine.

Manually operable control means are provided to enable shifting the carriage 22 in either direction through one or more ordinal spaces, and for this purpose the shift keys 111, 112 (Fig. 1) are depressible to initiate shifting of the carriage to the right and left, respectively. Depression of either of the shift keys 111, 112 serves to enable the associated drive connection in the manner to be hereinafter described, as well as to engage the main clutch 61 (Fig. 2) and to energize the driving motor of the machine, as is fully shown and described in the above-mentioned Friden Patent No. 2,315,780.

To enable the respective drive connections from the actuating shafts 57 to the carriage-shifting mechanism upon depression of the shift keys 111, 112, pins thereon overlie levers 121 and 122 (Fig. 2) secured on a sleeve 124 and a shaft 123 respectively. The manner in which this sleeve 124 and shaft 123 are rocked upon depression of the shift keys 111, 112 is fully shown and described in the above-mentioned Patent No. 2,315,780 and reference is made to this patent for a full disclosure of this part of the machine. As shown in Fig. 2, shaft 123 and sleeve 124 carry similar depending arms 126, 127, respectively, having their lower ends disposed in front of the respective shift control rods 128, 129 which have return springs 131 associated therewith to maintain the rods normally in an inactive position. At their rearward ends, each of the control rods 128, 129 carries a controller 311 adapted to coact with the associated clutch driving pawl 304 so that upon depression of either shift key 111, 112 the corresponding torque transmitting drive connection is established to the respective gear sleeves 102, 101 at the same time that the main clutch 61 is engaged and the motor is energized. Thus, by the selective depression of the shift keys 111, 112 the carriage shift drive disk 303 (Fig. 2) can be rotated in either direction to effect an ordinal shifting movement of the carriage.

Shift clutch mechanism

Means are provided for selectively connecting the respective gear sleeves 101, 102 (Fig. 2) with the driving motor of the machine through the main clutch 61 and the corresponding shift clutch driving pawl 304 and follower arm 305. The engagement and disengagement of the driving pawl 304 with its associated follower arm 305 is controlled by the respective control rods 128, 129 (Fig. 2), which may be manipulated in any desired manner, as by depressing the shift control keys 112, 111. The main drive shaft 58 of the machine is adapted to be unidirectionally driven by a suitable electric motor whenever the main clutch 61 is closed, which transverse shaft 58 imparts a corresponding unidirectional rotational movement through the right angle bevel gear drive 328 (Fig. 2) to the longitudinally disposed actuator shafts 57 which carry the stepped gear actuator drums 54, the construction and operation of which is fully described in the above-mentioned Friden Patent No. 2,229,889. In order to control the lateral shifting of the carriage in either direction, there is provided at the rearward end of each of the two lowest order actuating shafts 57 a shift clutch pawl or driving member 304 which is pivotally connected to its associated shaft 57 by the pin 350. Each such driving pawl 304 is adapted to be moved by its associated controller 311 (Figs. 2, 3, and 7) into engaging or disengaging position with relation to the associated shift clutch follower arm or driven member 305 in the manner now to be described.

The shift clutch and associated reversible shift drive assembly are so constructed and arranged that 360° rotation of the actuator shafts 57 determines one ordinal shifting movement of the carriage 22. Each clutch driving pawl 304 is substantially U-shaped, is pivotally connected to its supporting shaft 57 by the pin 350, and is provided with a clutch-engaging arm or coupler 308 having an engaging surface 316 shaped substantially as shown in Fig. 3. The arm 308 preferably will be angularly displaced away from the coacting clutch engaging surface 317 on the associated clutch driven arm 305 by the lead angle $a$ whenever the machine is in its normal full-cycle position shown in Fig. 3. This lead angle $a$ (Fig. 3), which also corresponds in magnitude to the angle by which the arm 305 is overthrown by the carriage momentum at the end of a shift cycle, has a small magnitude such as 15° (Fig. 3). This angle $a$ represents the predetermined control phase of the machine operating cycle during which all clutch engaging or disengaging movement takes place. In addition to effecting all engagement or disengagement of the clutch during the predetermined control phase of the machine cycle represented by the angle $a$, the relatively short time interval represented thereby may also be utilized for releasing a positive carriage shift stopping and locking mechanism of the type shown and described in my copending application S. N. 180,584, filed August 21, 1950. After the clutch-engaging arm 308 and the surface 316 thereon rotate through the angle $a$ and move into position to engage the coacting surface 317 on the follower arm 305, however, the resulting shift drive continues during the relatively long time interval represented by the angle $(360° - a)$. At the end of the cycle the driving or coupling arm 308 remains within the plane of the driven arm 305 and is in position for continued engagement or re-engagement therewith at the termination of a carriage shifting operation, however, carriage momentum causes the driven arm 305 to be overthrown so that surface 317 on arm 305 again becomes separated from the coacting surface 316 on arm 308 by the angle $a$ as the clutch components come to rest in the full-cycle position illustrated in Fig. 3.

Depending upon the positioning of the associated controller 311 during the operating phase of the machine cycle represented by the angle $(360° - a)$, the thus closed and previously engaged shift clutch may be selectively conditioned for continued engagement or disengagement during the time interval represented by the angle $a$ which corresponds with the predetermined control phase of the next machine cycle to follow. Hence, if the selected control phase angle $a$ is approximately 15°, the operating phase angle is approximately $360° - 15°$, or 345°. During a substantial portion of this 345° angular displacement of the actuator shafts 57, the associated controller 311 can be effectively positioned to control operation of the clutch at the beginning of the next shift cycle, and a relatively long time interval is thereby provided for control purposes. Such a relatively long time interval eliminates critical timing and assures wide latitude and flexibility in the operation of the associated clutch control mechanism.

Assuming now that the clutch control rods 128, 129 are initially positioned forwardly and that the respective shift clutches are disengaged (as shown in Fig. 2), either control rod 128, 129 may be moved rearwardly by the automatic multiplication or division mechanism of the machine, or by depressing the corresponding shift key 112, 111, so as to move the associated shift controller 311 from the normally inactive clutch disengaging position shown in Fig. 4 to the active clutch engaging position shown in Fig. 5. As each such controller 311 is moved rearwardly, a downwardly depending shove dog 314 thereon rocks an interlock arm 322 (Fig. 3) which is pivoted at 324 so as to move the other shift controller 311 to its inactive position, thereby enabling only one carriage shift clutch to be engaged at the same time. This movement of the controller 311 to its active position may, if desired, operate the pins 323 (Fig. 3) which are spring-urged against the coacting controller shove dogs 314 for controlling the associated carriage shift locking and stopping mechanism in the manner shown and described in my copending application S. N. 180,584, filed August 21, 1950. As the selected shift controller 311 is moved rearwardly from its normally inactive position to the active position shown in Fig. 5, it brings the angularly rearwardly extending clutch-engaging ear 313 thereon into operative position so as to impart a counter-clockwise rocking movement (Figs. 4 and 5) to the driving pawl 304 during the control phase angle $a$ at the beginning of the next machine cycle to follow. Preferably, though not necessarily, this rearward movement of the associated controller 311 causes the rearward face thereof to contact the pivotally supported pawl 304 in such a manner as to impart a slight counter-clockwise tilting rocking movement thereto before the shift cycle actually starts, whereas the camming action of the ear 313 during the control phase angle $a$ actually completes the movement of the clutch-engaging arm 308 into the plane of the clutch follower or driven arm 305 so as to thereafter establish a clutching engagement therewith. A friction washer 325 (Figs. 4 and 5), or other suitable detent device interposed between the pivoted clutch driver 304 and its supporting shaft 57, is adapted to retain and hold the clutch pawl 304 either in the inactive disengaged position shown in Fig. 4, or in the active and enabled position shown in Fig. 5.

It is a characteristic of the mechanism of the instant invention that the clutch driving arm 308 on pawl 304 remains in its active position within the general plane of the driven or follower arm 305 at the end of the machine cycle during which the clutch was engaged by its associated controller 311. In a continuous, or multiple order, shifting in the same lateral direction, the driving surface 316 on arm 308 remains in active clutching engagement with the coacting surface 317 on the associated clutch driven or follower arm 305, with the result that the lead angle $a$ is decreased to zero as long as the ordinal shifting of the carriage in the selected lateral direction continues. During such continuous ordinal shifting of the shiftable carriage 22, the forwardly extending clutch disengaging dog 312 on the associated controller 311 is positioned out of operative engagement with the hook-shaped clutch disengaging ear 326 on the clutch driver 304, as shown to the right in Fig. 7.

At the end of the desired ordinal shifting movement, however, the release of the control rod 128 or 129, and its consequent forward movement positions the disengaging dog 312 on the controller within the operative range of the disengaging ear 326 on the associated clutch driver so as to condition the previously engaged clutch for disengagement in the manner now to be described. During any time within the relatively long operating phase of the last shift cycle, corresponding approximately to a 345° angular displacement of the actuator shafts 57, the active shift controller 311 may be moved forwardly to its normally inactive position (shown in Figs. 4 and 7). When the controller 311 lies in its forward position it is obvious that the camming arm 313 thereon will be in its ineffective position. Also, the clutch disengaging arm 312 is positioned to engage the coacting ear 326 on the clutch pawl 304 to rock the clutch driver pawl 304 clockwise to disengage the clutch.

At the end of the last shift cycle in a carriage shifting movement, the clutch engaging and driving arm 308 remains within the plane of the clutch follower or driven arm 305, and the actuating shaft 57 comes to rest with the arm 308 in the full-cycle position shown in Fig. 3. In this manner the lug 312 and ear 326 are conditioned for engagement (as shown in Fig. 6), but lug 312 and ear 326 do not quite contact each other in the full-cycle position of the actuator shaft 57. After the clutch-engaging arm 308 has been stopped in the full-cycle position shown in Fig. 3, however, the momentum of the carriage 22 causes the latter to overtravel through the angle $a$ and be carried over into its home or full-cycle position determined by the associated carriage centralizing or stopping mechanism. As the shifting movement of the carriage is thus arrested and terminated, the surface 317 on follower arm 305 moves away from and angularly ahead of the coacting driving surface 316 on the clutch engaging and driving arm 308 by the predetermined initial phase control or lead angle $a$, so that the clutch components come to rest in the full-cycle position shown in Figs. 3 and 6. Hence, the associated shift controller 311 may again be positioned rearwardly so as to initiate a carriage shift in the same lateral direction during the next cycle, or the other shift clutch may be positioned to cause a shift in the opposite direction, or a digitation cycle (such as addition or subtraction) may be started, which restores both shift clutches to the disengaged position shown in Fig. 2. If the direction of carriage shift is reversed by the selective depression of the shift keys 111, 112, the previously disengaged shift clutch is engaged during the phase angle $a$ at the beginning of the next cycle in the manner previously described and substantially at the same time as the previously engaged clutch is disengaged by coaction between the ear 326 on the clutch driving pawl 304 and the disengaging lug 312 on the associated controller 311. Hence, the interlock lever 322 (Fig. 3) functions in the manner previously described during reversal of the carriage shifting movement to effectively prevent more than one shift clutch from being engaged at the same time.

It will thus be seen that all engaging and disengaging movements of the shift clutches occurs during the relatively short time interval indicated by the lead or carriage overthrow angle $a$ (Fig. 3) wherein the clutch is operating substantially at no load, thereby enabling the shift rods 128, 129 (Fig. 2) to be operated by light control key pressures. Moreover, a relatively long period of time is provided for transmitting torque and conditioning the clutch mechanism for engagement or disengagement in the next machine cycle to follow, thereby providing smooth clutch operation, minimum wear on the clutch components, and wide latitude and flexibility in the operation of the associated automatic and semi-automatic clutch control mechanisms.

I claim:

1. A unidirectional cyclic clutch comprising a driving shaft, a driven shaft adjacent to and coaxially aligned with said driving shaft, a radially extending driven arm mounted on the adjacent end of said driven shaft, a pivotally mounted driving arm extending radially across the end of said driving shaft, the axis of rotation of said driving arm being substantially perpendicular to the axis of said driving shaft, a disengaging ear on said driving arm lying in a plane substantially perpendicular to said driving arm, a control member, a cam on said control member operative in one position of the control member to rock the driving arm into engagement with the driven arm, a disengaging ear on said control member operative when said control member is in its other position to rock said driving arm to disengage the same from said driven arm.

2. The apparatus of claim 1 comprising also a retaining means operable to hold the driving arm in either adjusted position.

3. The apparatus of claim 1 wherein the driven arm, in its full-cycle position, leads the driving arm, when it is at rest, by an angle of the order of about 15°.

4. A normally open unidirectional clutch comprising a driving shaft, a driven shaft coaxially aligned with said driving shaft, an arm mounted on the end of said driven shaft in a plane perpendicular to the axis of rotation of said shaft, a driving pawl pivotally mounted on the end of said driving shaft, and having its axis of rotation substantially perpendicular to the axis of said driving shaft, a driver arm on said pawl lying diametrically across the end of the driving shaft, a disengaging ear on said pawl lying in a plane substantially perpendicular to said driver arm, a control member movable in a plane parallel to the axis of rotation of said shafts, a cam on said control member operative in one position of the control member to rock the pawl to cause the driver arm to engage the arm on the driven shaft, a disengaging ear on said control member operative when said control member is in its other position to rock said pawl to disengage said driver arm from said driven arm.

References Cited in the file of this patent

UNITED STATES PATENTS

| Number | Name | Date |
| --- | --- | --- |
| 912,087 | Dempsey | Feb. 9, 1909 |
| 1,340,333 | France | May 18, 1920 |
| 1,771,454 | Ward | July 29, 1930 |
| 2,363,737 | Machado | Nov. 28, 1944 |
| 2,488,820 | Laube | Nov. 22, 1949 |
| 2,621,620 | Chatfield et al. | Dec. 16, 1952 |